May 23, 1939.  A. N. HONIG  2,159,270
DEVICE FOR LAYING CLOTHS ABOUT PREPRESSED CAKES IN OIL-PRESSING APPARATUS
Filed Jan. 22, 1936   2 Sheets-Sheet 1
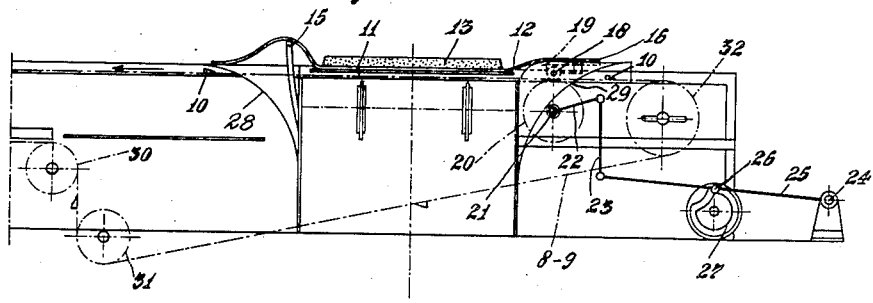
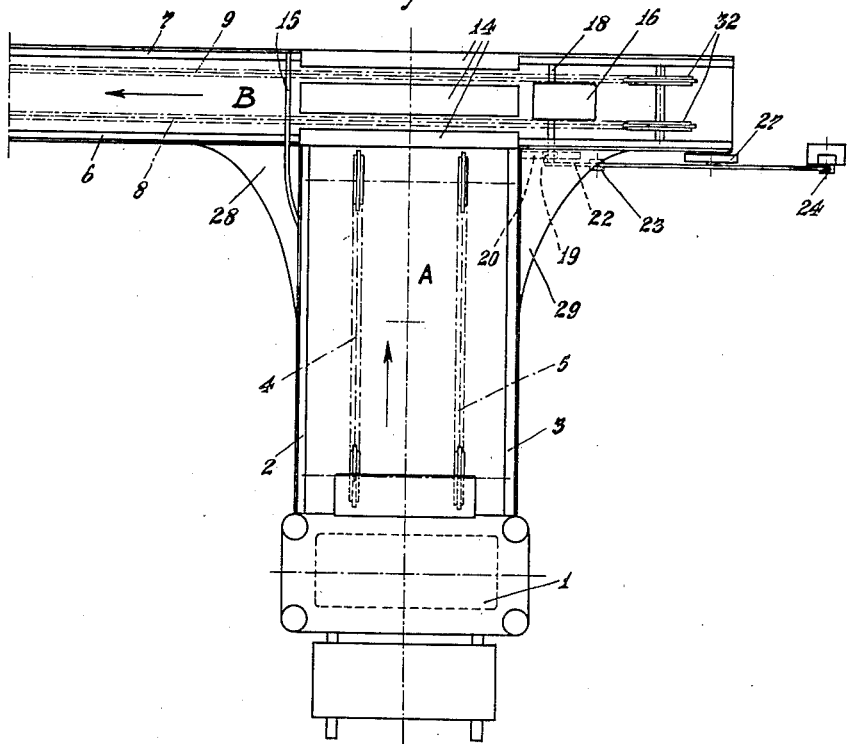

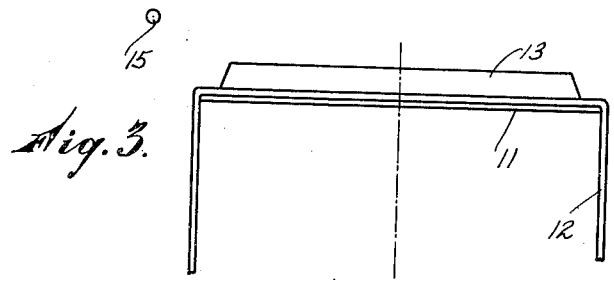
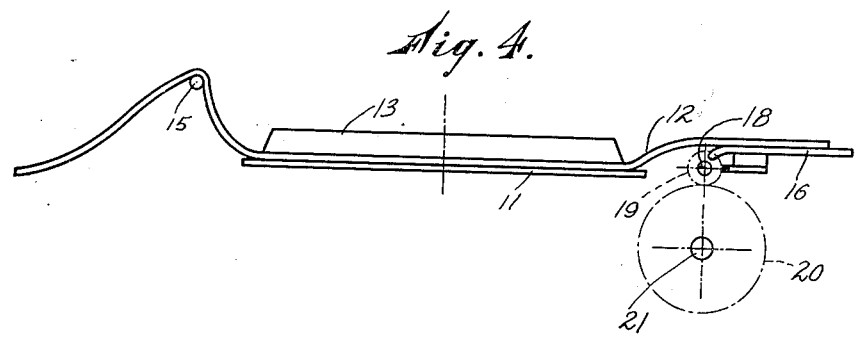
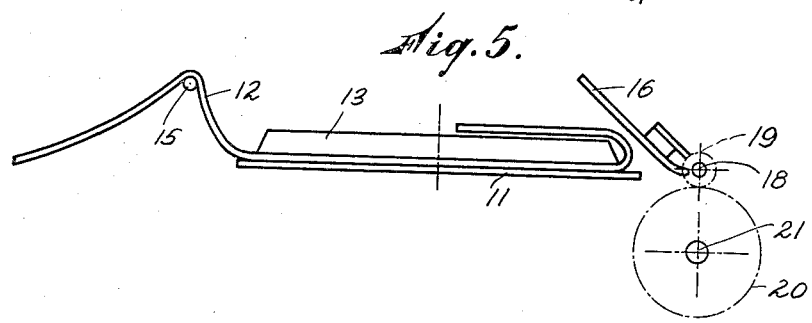
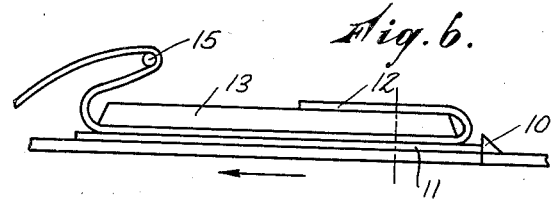
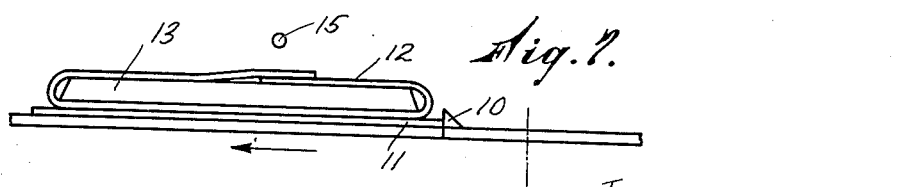

Patented May 23, 1939

2,159,270

UNITED STATES PATENT OFFICE 2,159,270

DEVICE FOR LAYING CLOTHS ABOUT PRE-PRESSED CAKES IN OIL-PRESSING APPARATUS

Adriaan Nicolaas Honig, Hilversum, Netherlands, assignor to Naamlooze Vennootschap: Oliefabrieken "Het Hart" en "De Zwaan" Voorheen Adriaan Honig, Zaandam, Netherlands, a corporation of the Netherlands Application January 22, 1936, Serial No. 60,326
In the Netherlands February 1, 1935

5 Claims. (Cl. 93—2)

The invention relates to a device for laying cloths about pre-pressed cakes in oil pressing apparatus of the known type, in which the pre-pressed cake leaving the press and lying on the cloth which is supported by a plate, is conveyed by means of a conveyor device to a second conveyor located at a normal to the first mentioned conveyor and leading to the presses.

According to the invention there is provided a stationary horizontal transverse rod located at the delivery end of that portion of the second conveyor upon which the plate with the cake and its cloth is deposited by the first conveyor, and at some distance above the cake, and also a flap rotating on a transverse shaft located at the other side of said portion of the conveyor whereas on each side of the first conveyor there are provided stationary guiding means shaped in such a way that of the portions of the cloth that are extending or hanging down on both sides beyond the path of the conveyor, one portion will be deposited on the flap, and the other portion will be hung over the transverse rod, so that by the rotation of the flap the one portion of the cloth is laid over the cake and by the further travel of the plate carrying the cake with its cloth, the other portion of the cloth which was hanging over the transverse rod, will leave the said rod and be deposited upon the cake.

By these means the wrapping of the cakes is effected entirely automatically and without interrupting the travel of the cakes. The wrapping, moreover, is done so that the cake after having received its preliminary pressing will be laid in its cloth in the manner most suitable for further pressing.

The invention will now be further explained with the aid of the drawings in which Fig. 1 is a schematic longitudinal section through the second conveyor.

Fig. 2 is a schematic plan view of the press with the first conveyor and a portion of the second conveyor, whereas Figs. 3 to 7 inclusive are diagrams illustrating the different functions of the device.

Into the press 1 there is first introduced at the front end a plate with a cloth lying on the same, upon which cloth a given quantity of the material to be pressed is deposited by means of a filling device, which material is then pre-pressed into a more or less even layer in the shape of a cake. After this preliminary pressing, the plate with the cake and the cloth is expelled from the other end of the press 1 and pushed onto a conveyor device A, mainly consisting of two angle irons 2, 3 which are mounted in such a way that the supporting plate will come to lie on the lower horizontal flanges and between the upstanding flanges. The portions of the cloth that are to be turned over, are therefore extending beyond the angle irons 2 and 3, and in the embodiment illustrated are hanging down on each side of the conveyor device. In order to move the supporting plate along the said conveyor device, there are provided two endless chains 4, 5 having lugs slightly extending above the upper surface of the horizontal flanges of the angle irons 2, 3, which chains are driven by some driving means, so that the lugs will push along the plate which they contact.

At a normal to the conveyor A, there is provided a second conveyor B, which likewise mainly consists of two angle irons 6, 7 and two endless chains 8, 9 with lugs (denoted by 10 in Fig. 1) with the aid of which the plate carrying the cake and the cloth is pushed along in the direction of the arrow (Fig. 2).

The cloth is to be turned over the short sides of the rectangular cake, so that the cake and the supporting plate will lie with their longest sides transverse to the conveyor A and with their shortest sides transverse to the conveyor B.

In Fig. 1 the plate 11 with the cloth 12 and the cake of material 13 deposited on the same, is illustrated while it is located on the spot at which it is delivered from the conveyor A.

In that position the plate 11 is supported by three stationary plates 14, one of which is located between the chains while the other two are mounted on either side of the conveyor B.

At the delivery side of said spot, consequently at the left hand side in Fig. 2, there is provided a stationary horizontal transverse rod 15, whereas at the opposite side there is provided a flap 16 which is mounted on a transverse shaft 18 rotatably supported at the ends in bearings attached to the bottom of the angle irons 6, 7. On that end of the shaft 18 which extends beyond the angle iron 6 there is mounted a gear wheel 19 engaging a larger gear wheel 20 mounted on a shaft 21 rotatably supported in the frame of the machine.

On this shaft 21 there is secured a lever 22 (Fig. 1) connected by means of a connecting link 23 to a lever 25 which at its other end is pivotally connected at 24 with the machine frame, which lever 25 is provided with a roller 26 fitting into a groove of a grooved disk 27 actuated by the machine drive.

There are moreover provided on each side of the conveyor A and joining the conveyor B stationary guiding means 28 and 29 (Fig. 2) of such shape that when the supporting plate 11 carrying the cloth 12 and the cake 13 deposited on the same is moved by the conveyor A towards the conveyor B, the depending ends of the cloth will be brought into the position shown in Fig. 4 and also in Fig. 1, i. e., so that the right hand portion of the cloth will rest on the flap 16, while the left hand portion will hang over the transverse rod 15. The guiding means 28 and 29 are saddle shaped surfaces which are defined between two lines, one of which is parallel to the direction of movement of the conveyor A and the other of which is located at the same height and parallel to the direction of movement of the conveyor B.

The lugs on the chains 4 and 5 of the conveyor and their speed are chosen so that when the supporting plate 11 carrying the cloth 12 and the cake 13 has reached the position indicated in Figs. 1 and 4, the flap 16 will perform a relatively quick rotation which causes the portion of the cloth resting on the same to be laid about the cake 13. This position is illustrated in Fig. 5. At the same or practically the same moment the lugs 10 of the chains 8 and 9 of the conveyor B will reach behind the supporting plate 11 (Figs. 6 and 7), moving the same towards the left, by which movement the left hand portion of the cloth is taken off the transverse rod 15 and deposited on the cake 13. An intermediate phase of this movement is illustrated in Fig. 6, while the position in which both portions of the cloth are laid about the cake is illustrated in Fig. 7.

It is shown in Fig. 1 how the returning portions of the chains 8, 9 are guided over the rollers 30 and 31 before reaching the conveyor A and finally at the turning point over rollers 32, so that when these chain portions are used for conveying back the used supporting plates 11, those plates after having passed the rollers 30 will arrive at a space where they are received by a third conveyor device (not shown in the figures) and returned to the press 1.

I claim:

1. A device for laying cloths about cakes that have been subjected to a preliminary pressing action comprising means for conveying a plate having a cloth thereon and a preliminarily pressed cake resting on said cloth to a station, means located at said station for folding an end of said cloth over said cake, and means for conveying said plate, cloth and cake from said station so that said plate may be separated from said cloth and cake so that said cloth and cake may be subjected to further pressing action.

2. A device for laying cloths about cakes that have been subjected to a preliminary pressing action comprising means for conveying a plate having a cloth thereon and a preliminarily pressed cake resting on said cloth to a station, means for raising the depending ends of said cloth to a substantially horizontal position, a pivoted flap for folding over on said cake one of said ends, and means for conveying said plate, cloth and cake from said station so that said plate may be separated from said cloth and cake so that said cloth and cake may be subjected to further pressing action.

3. A device for laying cloths about cakes that have been subjected to a preliminary pressing action comprising means for conveying a plate having a cloth thereon and a preliminarily pressed cake resting on said cloth to a station, means for raising the depending ends of said cloth to a substantially horizontal position during the travel of said plate, cloth and cake to said station, means located at said station for folding one of the ends of said cloth over said cake, means for conveying said plate, cloth and cake from said station, and means for folding the other end of said cloth over said cake on the travel of said plate, cloth and cake from said station so that said plate may be separated from said cloth and cake so that said cloth and cake may be subjected to further pressing action.

4. A device for laying cloths about cakes that have been subjected to a preliminary pressing action comprising means for conveying a plate having a cloth thereon and a preliminarily pressed cake resting on said cloth to a station, means for raising the depending ends of said cloth to a substantially horizontal position during the travel of said plate, cloth and cake to said station, means located at said station for folding one of the ends of said cloth over said cake, means for conveying said plate, cloth and cake from said station, and stationary means for folding the other end of said cloth over said cake on the travel of said plate, cloth and cake from said station so that said plate may be separated from said cloth and cake so that said cloth and cake may be subjected to further pressing action.

5. A device for laying cloths about cakes that have been subjected to a preliminary pressing action comprising means for conveying a plate having a cloth thereon and a preliminarily pressed cake resting on said cloth to a station, stationary means for raising the depending ends of said cloth to a substantially horizontal position during the travel of said plate, cloth and cake to said station, a stationary rod located above said cake at said station over which one end of said cloth is deposited, a pivoted flap located at the opposite side of said station from said rod upon which the other end of said cloth is deposited, means for pivoting said flap so as to deposit the end of cloth thereon on said cake, and means for conveying said plate, cloth and cake from said station so that on movement of said plate, cloth and cake from said station the end of said cloth on said rod will be wiped over and deposited on said cake so that said plate may be separated from said cloth and cake so that said cloth and cake may be subjected to further pressing action.

ADRIAAN NICOLAAS HONIG.